United States Patent [19]
Fujita

[11] 3,750,523
[45] Aug. 7, 1973

[54] NAIL

[75] Inventor: Keiichi Fujita, Kawasaki, Japan

[73] Assignee: Fujita Kenzo Kogyo Co., Ltd., Kawasaki City, Kanagawa, Japan

[22] Filed: Nov. 26, 1971

[21] Appl. No.: 202,080

[30] Foreign Application Priority Data
Nov. 27, 1970  Japan.............................. 45/117939
Jan. 14, 1971  Japan.................................. 46/1163

[52] U.S. Cl............................ 85/28, 85/1 JP, 85/50
[51] Int. Cl............................................. F16b 35/00
[58] Field of Search ................. 85/1 JP, 9, 28, 50, 85/1 C; 151/14.5

[56] References Cited
UNITED STATES PATENTS
951,437    3/1910   Gehrke.............................. 85/1 JP
1,335,756  4/1920   Scarff.................................... 85/28
2,048,234  7/1936   Tucker................................... 85/28
2,917,819  12/1959  Britton et al......................... 85/1 JP
2,927,495  3/1960   Barwood............................... 85/1 JP
3,469,490  9/1969   Pearce................................. 85/50 R
3,584,531  6/1971   Greenleaf........................... 85/1 JP FOREIGN PATENTS OR APPLICATIONS
846,316   8/1960   Great Britain..................... 85/50 R Primary Examiner—Marion Parsons, Jr.
Attorney—James E. Armstrong et al.

[57] ABSTRACT

A nail comprised of a bar-shaped drive member and a nail head which forms the top of the pin, the nail head being shaped in the form of a dish which is open toward the end of the pin with the interior of the nail head being filled with a variable water-proof material.

2 Claims, 6 Drawing Figures

PATENTED AUG 7 1973 3,750,523

NAIL

BACKGROUND OF THE INVENTION

The present invention relates to a nail which will be used for fixing the roofing materials and wall plates.

Since the conventional type of the nail such as, for example, ordinary nails and wood screws form holes in a plate when it is driven into the plate, intrusion of the water from a portion where the nail is driven cannot be avoided. Accordingly, when the nail is used for fixing the roofing materials and external walls, it is necessary to cover the nail driving portion with a metal plate to make the portion water-proof.

The present invention provides a nail which can eliminate the disadvantages described above.

SUMMARY

The present invention provides a nail comprising a bar-shaped drive member such as, for example, a pin or screw and a nail head is shaped in the form of a hollow dish which is open toward the drive member end and the cavity of the hollow nail head is filled with a water-proof material such as wax, rubber, etc. and the water-proof material blocks the hole on the plate into which the drive member is driven.

BRIEF DESCRIPTION OF THE DRAWINGS

The present invention is illustrated in detail by the accompanying drawings wherein.

DETAILED DESCRIPTION

Figure 1:
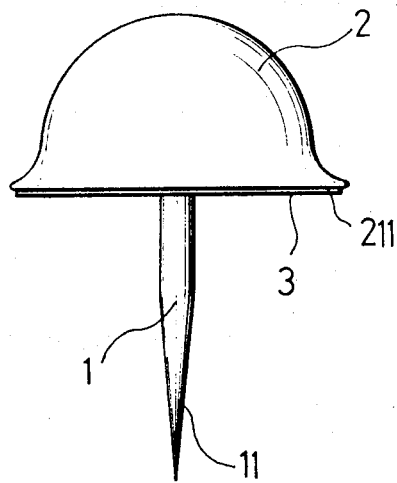
FIG. 1 is a front view of a nail according to the present invention.
Figure 2:
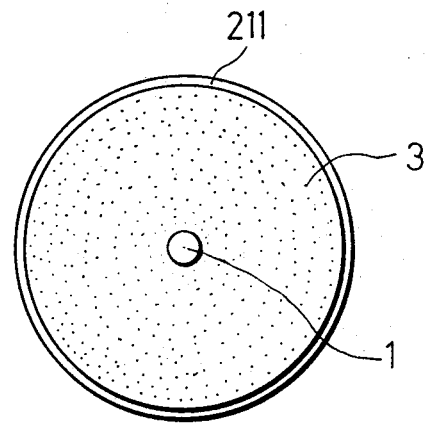
FIG. 2 is a bottom view of the nail.
Figure 3:
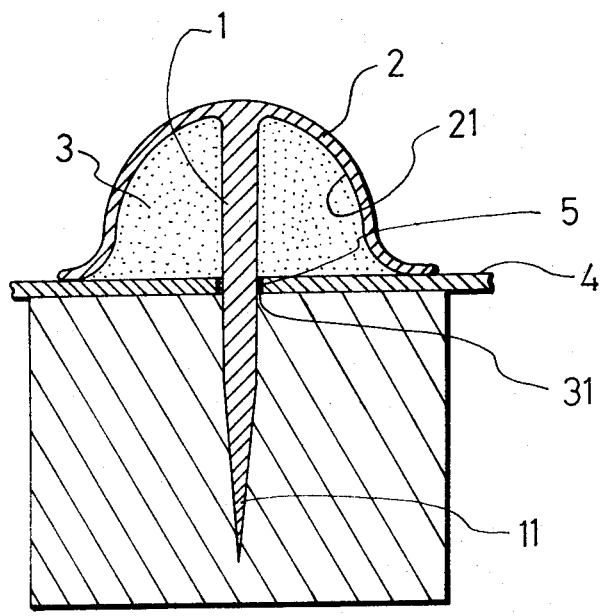
FIG. 3 is a sectional view illustrating the nail being used.

Referring to FIGS. 1 to 3, there is shown a nail comprised of pin 1 as the drive member, nail head 2 which is integrally provided with the pin and water-proof material 3 which is filled in the cavity of the nail head. The pin is made to have sharpened end 11 and nail head 2 is shaped in the form of dish or cup to form internal cavity 21 which is open toward the end of the pin and to cover the upper end of the pin.

Cavity 21 of nail head is filled with a viscous material such as, for example, putty, wax, caulking, etc. or a absorptive and elastic material such as, for example, rubber, that is, a deformable and adhesive water-proof material 3.

This water-proof material 3 is required to be filled in the cavity of the nail head so that the water-proof material closely adheres to the surface of the plate while being pressed and deformed when the nail is driven into the plate. Accordingly, if the nail head is depressed and deformed by driving, it is satisfactory that the water-proof material does not reach open end 211 of the nail head; however, in other cases, it is desirable to fill the cavity of the nail head to the extent that the water-proof material slightly overflows from open end 211 of the nail head as shown in FIG. 1. When the nail shown in the embodiment is driven into plate 4, internal water-proof material 3 is compressed to deform and closely adheres to the surface of the plate, thus completely closing driving hole 5 as shown in FIG. 3. In this case, if a high viscosity material is used as water-proof material 3, part 31 of the water-proof material is forced to enter into hole 5 due to compression and therefore a complete water-proof effect can be ensured.

The nail according to the present invention can be made as described below. Drive member 1 can be made in the form of screw as shown in FIG. 5.

It is desirable to make nail head 2 with a deformable material such as, for example, a synthtic resin, mild iron or aluminium so that the capacity of the internal cavity 21 is reduced when the nail is driven in. In this case, it is desirable to separately make nail head 2 and drive member 1 an to weld the nail head to the drive member as shown in FIGS. 4 and 5.

Figure 4:
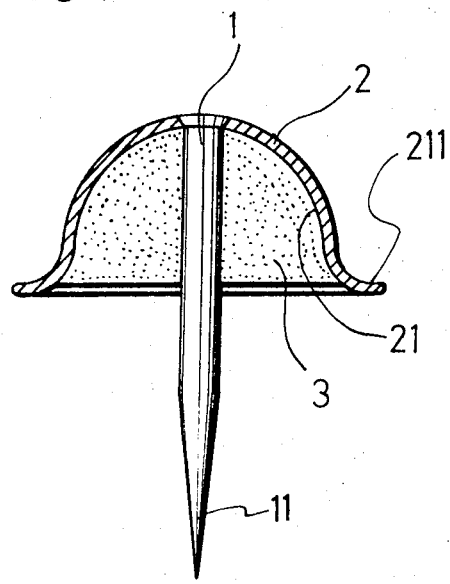
FIG. 4 and 5 are cross-sectional views illustrating other embodiments of the nail.

If nail head 2 is made of a material which is prone to deform, open end 211 of the nail head can be bent inside so that it can be easily depressed but it is desirable that the open end be bent outside as shown in FIG. 4. Thus, the nail head is effectively crushed because open end 211 is expanded due to the crush of nail head 2 and the nail head is advantageous in that the contacting area of water-proof material 3 with plate 4 becomes wide.

Figure 5:
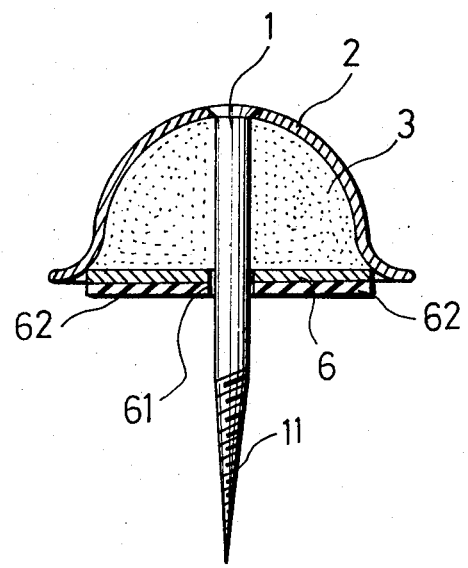

Nail head 2 can be provided with cover plate 6 at the opening side as shown in FIG. 5.

Cover plate 6 is provided with hole 61 into the center of which drive member 1 is loosely inserted and is arranged so that the lower surface of the cover plate is slightly projected from internal cavity 21 of the nail head.

When the nail with such the nail head is driven into the plate, cover plate 6 is pressed onto the cavity and the water-proof material comes out from hole 61 to impregnate into plate 4 to fill hole 61 provided in plate 6 by driving the nail.

In this embodiment, a water-proof effect can be futher improved owing to close contact of the cover plate and the plate, by making the entire cover plate 6 of an elastic water-proof material such as, for example, a rubber or laminating elastic water-proof material 62, onto the lower surface of cover plate 6 which contacts the plate.

Figure 6:
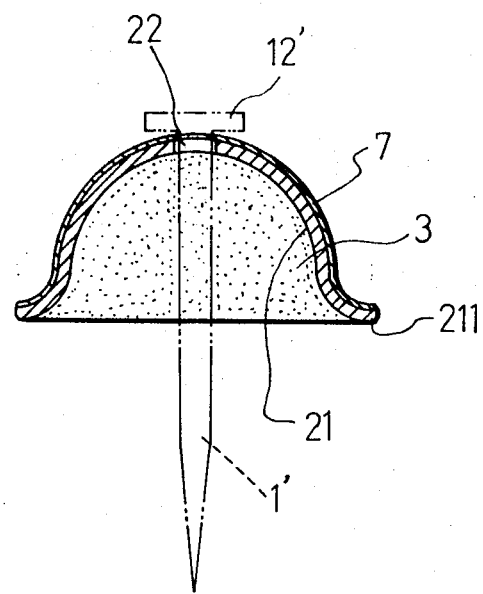
FIG. 6 is a cross-sectional view of a nail head which is to be used for the nail according to the present invention.

According to the embodiment, deterioration of the viscosity of water-proof material 3 due to drying and leakage of the water-proof material can be effectively prevented because cavity 21 of the nail head is covered with cover plate 6. Furthermore, drive member 1 and the nail head can be separately made; for example, anil head 2 can be used as a unit part as shown in FIG. 6.

In this case, it is advantageous in the point that the same type of the nail head can be used for various nails and screws and therefore the nail head is provided with through hole 22 for inserting the drive member at the top of the nail head.

The size of through hole 22 may be smaller than head 12' of separately prepared drive member 1'; accordingly, the through hole can be large enough to meet various types of drive members.

In the above embodiment, if a viscous material is used as the water-proof material for the nail according to the present invention, it is desirable to make the nail head air-tight to prevent hardening of the water-proof material due to drying. Therefore, it is desirable to cover the nail head with synthetic resin film 7 or to coat it. And the coating material can be a water-soluble material.

The nail according to the present invention is as described above. Water-proof treatment can be ensured merely by driving the pin into the plate, and intrusion of water and emergence of rust on the drive member can be prevented.

I claim:

1. A self-sealing mechanical fastener comprising:
   a. a shank portion for penetrating surfaces,
   b. a dish-shaped head portion provided at the top of said shank portion having a cavity facing said shank portion,
   c. a water-proof material disposed in said cavity of said head portion adapted to adhere to a surface into which said shank portion penetrates, and
   d. a cover plate loosely fitting around said shank portion and abutting the open end of said head portion, said cover plate having laminated to the lower surface thereof an elastic water-proof material.

2. A self-sealing mechanical fastener according to claim 1 wherein the open end of said head portion is bent outwardly along the periphery thereof.

* * * * *